US011126836B2

(12) United States Patent
Rouaix et al.

(10) Patent No.: US 11,126,836 B2
(45) Date of Patent: Sep. 21, 2021

(54) GROUPING STROKES OF DIGITAL INK

(71) Applicant: Microsoft Technology Licensing, LLC, Redmond, WA (US)

(72) Inventors: Francois M. Rouaix, Issaquah, WA (US); Eric Yanowitz, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/367,705

(22) Filed: Mar. 28, 2019

(65) Prior Publication Data
US 2020/0311405 A1  Oct. 1, 2020

(51) Int. Cl.
*G06K 9/00* (2006.01)
*G06K 9/20* (2006.01)
*G06K 9/22* (2006.01)
*G06K 9/62* (2006.01)
*G06T 7/70* (2017.01)
*G06T 7/60* (2017.01)

(52) U.S. Cl.
CPC ....... *G06K 9/00416* (2013.01); *G06K 9/2072* (2013.01); *G06K 9/222* (2013.01); *G06K 9/6253* (2013.01); *G06T 7/60* (2013.01); *G06T 7/70* (2017.01)

(58) Field of Classification Search
CPC .................. G06F 40/171; G06K 9/00409; G06K 9/6219; G06K 2209/01; G06K 9/00402; G06K 9/00476; G06K 9/2054
USPC ................ 382/159, 224, 188, 187, 313, 106
See application file for complete search history.

(56) References Cited

U.S. PATENT DOCUMENTS

| 5,774,586 A * | 6/1998 | LeCun ..................... G06K 9/32 382/200 |
| 9,077,823 B1* | 7/2015 | Grosz ................ H04N 1/00196 |
| 2003/0007683 A1 | 1/2003 | Wang et al. |
| 2008/0260241 A1 | 10/2008 | Ye et al. |
| 2016/0328145 A1* | 11/2016 | Petkov .................. G06F 3/0447 |

(Continued)

FOREIGN PATENT DOCUMENTS

WO    2017205987 A1    12/2017

OTHER PUBLICATIONS

"International Search Report and Written Opinion Issued in PCT Application No. PCT/US2020/023474", dated Jun. 16, 2020, 12 Pages.

*Primary Examiner* — Kiet M Doan
(74) *Attorney, Agent, or Firm* — Newport IP, LLC; Jacob P. Rohwer

(57) ABSTRACT

Technologies are disclosed for grouping strokes of digital ink. The disclosed technologies receive a new stroke of digital ink and, responsive thereto, identify groups of strokes that are candidates for receiving the new stroke. Heuristics are computed for one of the candidate groups and for the new stroke. A confidence value is computed for the new stroke based upon the heuristics for the new stroke and the candidate group. If the confidence value exceeds a confidence threshold, which can be user-adjustable, the new stroke of digital ink is added to the candidate group. This process can then be repeated for other candidate groups until a group is found for the new stroke. If no group is found, a new group can be created for the new stroke. A machine learning model can also generate weights for use in computing confidence values.

17 Claims, 10 Drawing Sheets

(56) References Cited

U.S. PATENT DOCUMENTS

2017/0011262 A1* 1/2017 Onis .................... G06K 9/2054
2017/0109578 A1* 4/2017 Bednarowicz ........ G06F 40/205

* cited by examiner

DISPLACEMENT HEURISTIC

TIME HEURISTIC

CANDIDATE GROUP

ANGLE HEURISTIC

DEVICE HEURISTIC /
INK HEURISTIC /
USER HEURISTIC

LENGTH HEURISTIC

GROUPING STROKES OF DIGITAL INK

BACKGROUND

Various types of computing devices and a variety of software applications enable "inking" input, wherein a user composes text or drawings from stroke inputs, sometimes referred to as "strokes" of digital ink. For example, some computing devices accept digital ink input via natural user interface input methods (e.g., touch or gesture), via a handwriting input device (e.g., a digital pen or stylus), or by movement of a mouse pointer, touchpad pointer, etc.

Individual strokes of digital ink can be grouped together to allow a user to manipulate a group of strokes at the same time such as, for instance, moving a word formed of multiple digital strokes. As one specific example, a user might write individual letters that together form a word. Each of the letters in the word are made up of one or more individual strokes of digital ink and, therefore, are only individually selectable if not grouped with strokes for the other letters in the word. In order to perform an operation on the entire word, such as moving the word, a user would have to select all of the strokes for the letters in the word individually or manually group the strokes.

Some computing systems automatically group related strokes of digital ink using a pure proximity-based model. In these solutions, the size of a box containing each new ink stroke is computed. If the box overlaps or is within a predetermined distance of a box encompassing a group of strokes, then the ink stroke is added to that group. Since the distance between strokes must be hard-coded ahead of time, this solution tends to either over-group (i.e. all strokes end up in the same group no matter how far apart they are) or under-group (i.e. strokes that are clearly part of the same word or even the same letter end up in different groups). These types of solutions also do not perform well for users that writing in different languages or that have different sizes of handwriting.

Other solutions utilize machine learning ("ML")-based ink analysis models that attempt to recognize words and then manually set up groups of strokes based upon the identified words. These approaches also have several problems. First, these approaches only work if a set of training data is available to train the ML model. ML-based mechanisms also require a trained ML model for each language and ML models for recognizing the languages. Secondly, these approaches are very resource intensive, commonly requiring a server. As a result, these approaches can take 500 ms or more to identify the proper group for a stroke, which can be extremely frustrating for users.

It is with respect to these and other technical challenges that the disclosure made herein is presented.

SUMMARY

Technologies are disclosed herein for grouping strokes of digital ink (which might be referred to herein simply as "strokes" or a "stroke"). The disclosed technologies address the technical problems described above by grouping strokes of digital ink in a manner that does not require a computationally-expensive ink analysis and that does not use a pure proximity-based model. Implementations of the disclosed technologies can, therefore, address the technical problems described above, and potentially others, by more accurately grouping strokes and by grouping strokes more quickly than previous ML-based mechanisms, thereby conserving computing resources and improving user experience. Other technical benefits not specifically mentioned herein can also be realized through implementations of the disclosed subject matter.

In order to provide the technical benefits described above, and potentially others, the disclosed technologies receive a new stroke of digital ink and, responsive thereto, identify groups of strokes that are candidates for receiving the new stroke. For example, and without limitation, all of the groups of strokes on a canvas (e.g. a presentation slide) might be selected as candidate groups. In another embodiment, groups of strokes within a predetermined radius based on the size of the new stroke might be selected as candidate groups. Other mechanisms for selecting candidate groups for the new stroke can be utilized in other configurations.

Once the candidate groups have been selected, heuristics are computed for one of the candidate groups and for the new stroke. Heuristic scores are then computed based upon the heuristics for the group ("group heuristics") and the heuristics for the new stroke ("new stroke heuristics"). A confidence value is then computed for the new stroke by weighting the heuristic scores and summing the weighted heuristic scores. The weights can be determined manually or through machine learning.

If the confidence value exceeds a confidence threshold, which can be defined or adjusted (e.g. by modifying a preset base value) by a user, the new stroke of digital ink is added to the candidate group. This process can then be repeated for other candidate groups until a group is found for the new stroke. If no group is found, a new group can be created for the new stroke. In some embodiments, all of the candidate groups are evaluated, and the new stroke is added to the candidate group having the highest confidence value.

In one embodiment, group heuristics are computed for the candidate groups based upon heuristics for the previously-made strokes of digital ink in the candidate groups. For example, and without limitation, the heuristics can include a displacement heuristic that measures a distance from a center of a first previously-made stroke of digital ink in a candidate group to a center of a second previously-made stroke of digital ink in the candidate group. The heuristics might also include a time heuristic measuring a time between an end of a first previously-made stroke of digital ink and a start of a second previously-made stroke of digital ink.

The heuristics might also include an angle heuristic measuring an angle between a center of a first previously-made stroke of digital ink and a center of a second previously-made stroke of digital ink. The heuristics can also include a length heuristic that defines a length of a previously-made stroke of digital ink, a device heuristic that defines a device used to create a previously-made stroke of digital ink, and a user heuristic identifying a user that created a previously-made stroke of digital ink. The heuristics might also include an ink type heuristic defining an ink type used to create a previously-made stroke of digital ink. Other heuristics can be utilized in other configurations. The mean of heuristics for all of the strokes in a candidate group are used as the group heuristics in some configurations.

In some configurations, the confidence values described above can be utilized in conjunction with a ML model, such as a support vector machine ("SVM"), to group strokes of digital ink. For example, in one configuration ML is used to train group heuristics to pick an optimal set of heuristic weights that make the highest percentage of correct groupings when used along with the group heuristics to produce the confidence value. In some configurations, a second ML algorithm can run using the confidence values and correctness labels to train a better threshold. User corrections to grouping decisions made by the ML model can be utilized for further training of the ML model.

It should be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
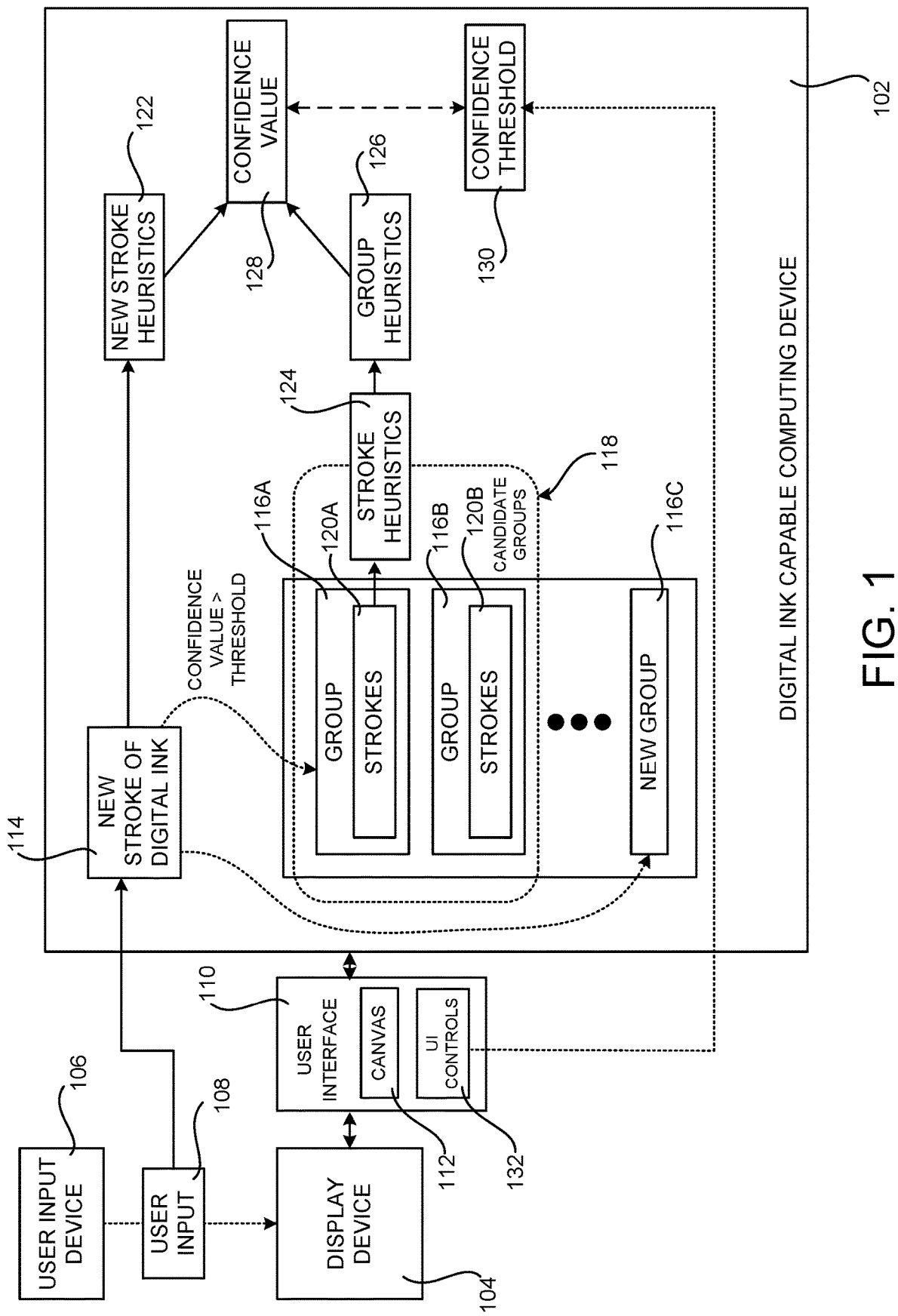
FIG. 1 is a schematic diagram illustrating aspects of the configuration and operation of a computing device configured to implement the disclosed technologies, according to one particular configuration.

The following detailed description is directed to technologies for grouping strokes of digital ink. As discussed briefly above, implementations of the disclosed technologies can group strokes of digital ink in a manner that does not require a computationally-expensive ink analysis and that does not use a pure proximity-based model. Implementations of the disclosed technologies can, therefore, group strokes more accurately and quickly than previous mechanisms, thereby conserving computing resources and improving user experience. Other technical benefits not specifically mentioned herein can also be realized through implementations of the disclosed subject matter.

Those skilled in the art will recognize that the subject matter disclosed herein can be implemented with various types of computing systems and modules, at least some of which are described in detail below. Those skilled in the art will also appreciate that the subject matter described herein can be practiced with other computer system configurations, including hand-held devices, multiprocessor systems, microprocessor-based or programmable consumer electronics, computing or processing systems embedded in devices (such as wearables, automobiles, home automation etc.), computing or processing systems embedded in devices (such as wearable computing devices, automobiles, home automation etc.), and the like.

In the following detailed description, references are made to the accompanying drawings that form a part hereof, and which are shown by way of illustration specific configurations or examples. Referring now to the drawings, in which like numerals represent like elements throughout the several FIGS., aspects of various technologies for grouping strokes of digital ink will be described.

FIG. 1 is a schematic diagram illustrating aspects of the configuration and operation of a digital ink capable computing device 102 (which might also be referred to herein as "the computing device 102" or simply "the device 102") that implements the disclosed technologies in one particular configuration. The computing device 102 can be any type of computing device (e.g. a tablet, laptop, desktop, or smartphone) that includes functionality for enabling a user to a compose text or drawings from stroke inputs, sometimes referred to as "strokes" of digital ink. For example, the computing device 102 might be configured to accept digital ink input via natural user interface input methods (e.g., touch or gesture), via a handwriting input device (e.g., a digital pen or stylus), or by movement of a mouse pointer, touchpad pointer, etc.

In order to enable inking in the manner described above, the computing device 102 can be configured with a touch-sensitive display device 104. The touch-sensitive display device 104 can detect user input 108 made by a user input device 106 (e.g. a digital pen, stylus, mouse, etc.) or via touch or gesture made by a finger or other appendage. User input made to the display device 104 using any mechanism might be referred to herein as a "touch."

As discussed above, the user input 108 can include strokes of digital ink. A stroke of digital ink is defined from the time a touch on the display device 104 begins (e.g. when a digital pen first touches the display device 104) to the time the touch ends (e.g. when a digital pen no longer touches the display device 104).

In some configurations, the computing device 102 includes hardware and/or software components (e.g. an operating system) for processing the user input 108 and providing the user input 108 to applications for further processing. Software components can also be executed on the computing device 102 for grouping strokes of digital ink in the manner described below.

As shown in FIG. 1, the computing device 102 can provide a suitable user interface ("UI") 110 for enabling a user to generate digital ink. The UI 110 can include, for instance, a canvas 112 configured for receiving digital ink. For example, a presentation application might define the canvas 112 as a slide of a presentation. A whiteboard application might define the canvas 112 as a virtual whiteboard. Other types of applications can define other types of canvases 112 for receiving virtual ink.

As also shown in FIG. 1, the canvas 112 can also include various UI controls 132 for defining the type of digital ink (e.g. color, pen thickness, pen type, etc.). The UI controls 132 can also be utilized for performing other types of functions including, but not limited to, setting a confidence threshold 130 that defines a level of confidence that a stroke of digital ink belongs in a candidate group before that must be present before the stroke is placed into the group. Details regarding this aspect will be provided below.

As discussed briefly above and in further detail below, a new stroke of digital ink 114 (which might be referred to herein as the "new stroke 114") can be placed into a group 116 with other strokes 120 or, alternately, a new group 116 can be created for the new stroke 114. Strokes 120 in a particular group 116 can be operated on collectively. For instance, the strokes 120A in the group 116A might be the strokes in a single word and, therefore, operations (e.g. a movement or deletion operation) can be performed on the word rather than individually on the strokes 116A.

In the illustrative example shown in FIG. 1, the new stroke 114 can be placed into either a group 116A that includes the strokes 120A or a group 116B that includes the strokes 120B. Alternately, a new group 116C can be created for the new stroke 114 and the new stroke 114 can be placed into that group 116C.

In order to identify a group 116 for the new stroke 114, candidate groups 118 are first identified for the new stroke 114 following receipt of the new stroke 114. In the example shown in FIG. 1, for instance, the candidate groups 118 include the group 116A and the group 116B. The candidate groups 118 for receiving a new stroke 114 can be selected in various ways. For example, and without limitation, all of the groups 116 of strokes 120 on a canvas 112 (e.g. a presentation slide) might be selected as candidate groups 118 for the new stroke 114. In another embodiment, groups 116 of strokes 120 within a predetermined radius selected based on the size of the new stroke 114 might be selected as the candidate groups 118. Other mechanisms for selecting candidate groups 118 for a new stroke 114 can be utilized in other configurations.

Once the candidate groups 118 for a new stroke 114 have been selected, group heuristics 126 are computed for one of the candidate groups 116. As will be described in greater detail below, the group heuristics 126 are computed for the candidate groups 116 based upon stroke heuristics 124 for the previously-made strokes 120 of digital ink in the candidate groups 116. In some configurations, the group heuristics include the mean of each of the heuristics for each stroke in a candidate group.

Heuristics 122 are also computed for the new stroke 114. Details regarding the computation of the group heuristics 126 and the new stroke heuristics 122 will be provided below with regard to FIGS. 2-3F and 5.

Once the group heuristics 126 and the new stroke heuristics 122 have been computed, heuristic scores 127 are computed based upon the new stroke heuristics 122 and the group heuristics 126. In one embodiment, the heuristic scores 127 are computed by determining the number of standard deviations each heuristic 122 for the new stroke 114 are away from the corresponding group heuristic (i.e. the mean of the heuristics for all strokes in the candidate group). The heuristic scores 127 are then calculated as 2^(AbsoluteValue (number of standard deviations))*sign (number of standard deviations). Other mechanisms can be used to compute the heuristic scores 127 in other configurations.

Once the heuristic scores 127 have been computed, a confidence value 128 is computed for the new stroke 114. In one embodiment, the confidence value 128 is computed by multiplying the heuristic scores 127 by the heuristic weights 129 and summing the results. The heuristic weights 129 can be user-specified or can be learned using machine learning. One mechanism for learning the heuristics using ML will be described below.

If the confidence value 128 exceeds a confidence threshold 130, which can be defined or adjusted (e.g. by modifying a preset base value) by a user such as through the use of a UI control 132, the new stroke 114 of digital ink is added to the candidate group 116. As shown in FIG. 1, for instance, the new stroke 114 might be added to the group 116A if the confidence value 128 exceeds the confidence threshold 130.

If the confidence value 128 does not exceed the confidence threshold 130, then the process described above can be repeated for other candidate groups 118 until a group 116 is found for the new stroke 114. In the example shown in FIG. 1, for instance, the process described above would be repeated for the group 116B. If no group is identified for the new stroke 114 after examining all of the candidate groups 118, a new group 116C can be created for the new stroke 114 (illustrated in FIG. 1 as an alternate to placing the stroke 114 in the group 116A). Additional details regarding this process are provided below with regard to FIGS. 2-9.

Figure 2:
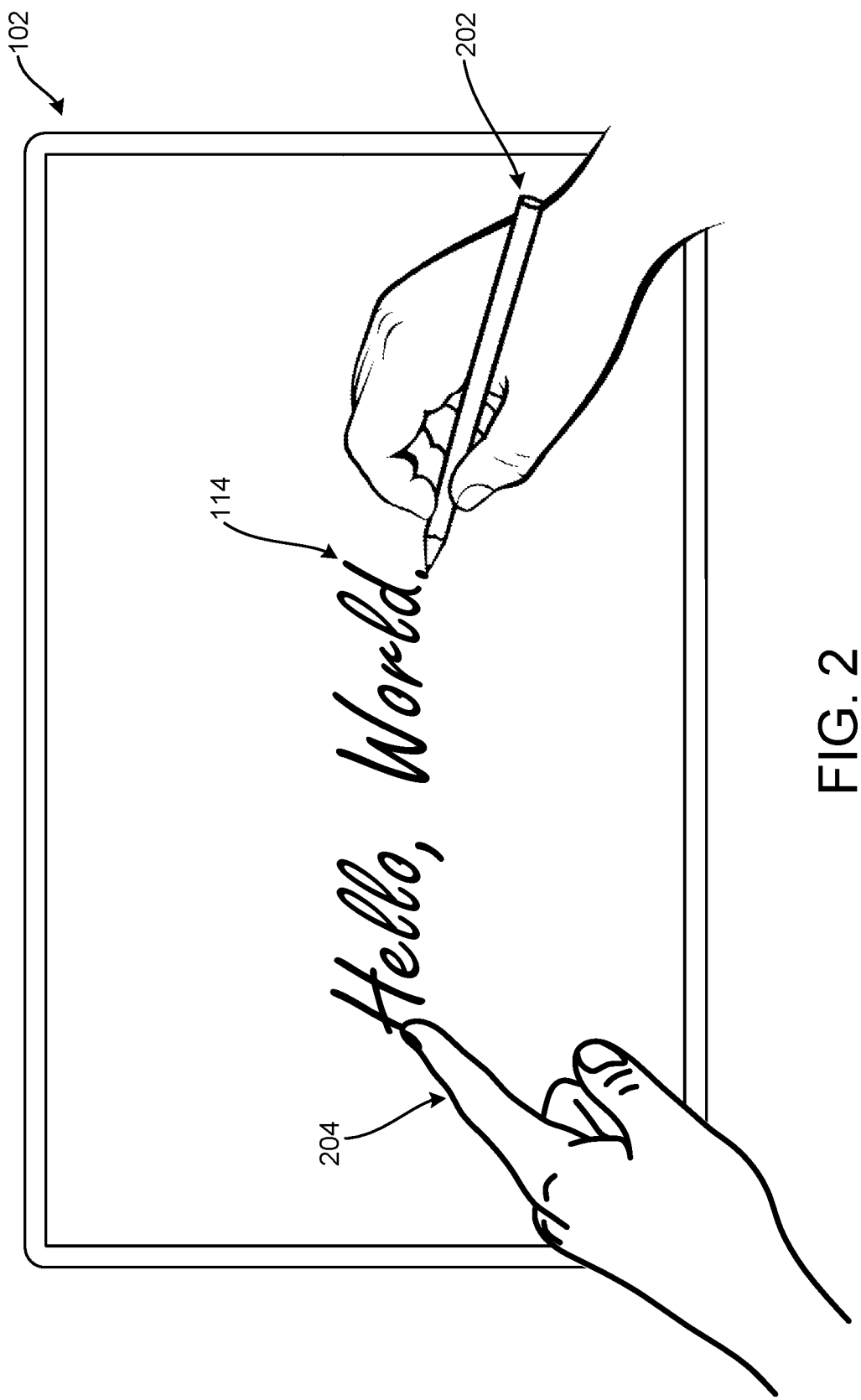
FIG. 2 is a pictorial diagram showing additional aspects of the configuration and operation of the computing device illustrated in FIG. 1.

FIG. 2 is a pictorial diagram showing additional aspects of the configuration and operation of the computing device 102 illustrated in FIG. 1. In the example shown in FIG. 2, the computing device 102 is a tablet computer. As discussed above, other types of digital ink capable computing devices can be used in other configurations.

Figure 3B:
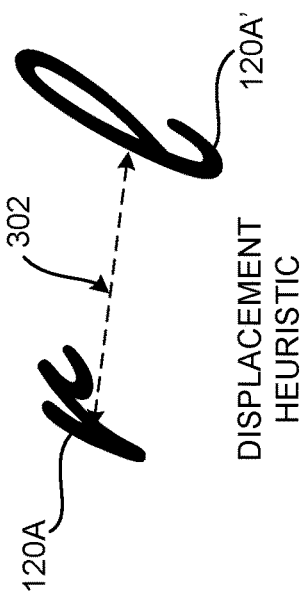
FIGS. 3A-3F are pictorial diagrams showing aspects of the computation of various heuristics for an illustrative new stroke of digital ink, according to one embodiment disclosed herein.
Figure 3D:
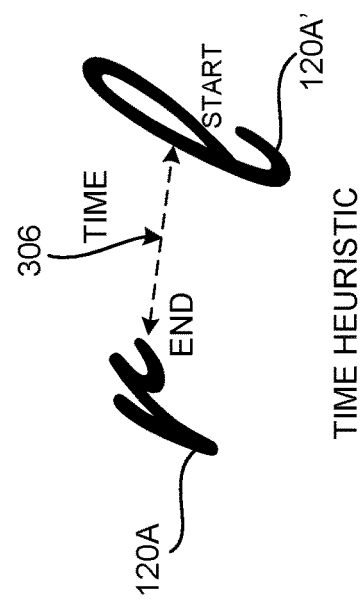
Figure 3A:

As also discussed briefly above, a user can generate digital ink by touching the surface of the tablet computer shown in FIG. 2 with their hand 204, with a digital pen 202, or in another manner. In this example, a user has written the phrase "Hello, World" in digital ink. The stroke 114 for the "d" in "World" will be used to illustrate aspects of the technologies disclosed herein for grouping strokes of digital ink. In particular, and as shown in FIG. 3A, the strokes for "W", "o", "r", and "l" have been written and grouped into a group 116A, which forms an illustrative candidate group for the stroke 114. The user has then written a new stroke 114 for the letter "d." The examples below illustrate various processing operations that can be performed to determine if the stroke 114 for the letter "d" is to be placed in the group 116A along with the strokes for "W", "o", "r", and "l". If these strokes are placed into the same group, a user would be able to perform operations on the entire word, rather than on the individual strokes.

As discussed briefly above, group heuristics 126 are computed for groups 116 in the candidate groups 118 based upon stroke heuristics 124 for the previously-made strokes of digital ink that are already in the candidate groups. The group heuristics 126 for a group are computed by calculating a set of heuristics for strokes in the candidate group. The strokes in the candidate group can be processed in the order that they were originally added to the group or in another manner.

Some of the stroke heuristics 124 are computed based upon relationships between previously-made strokes already in a candidate group. For example, and as illustrated in FIG. 3B, the stroke heuristics 124 can include a displacement heuristic that measures the distance 302 from the center of a first previously-made stroke 120A (the letter "r" in this example) in a candidate group to the center of a second previously-made stroke 120A' (the letter "l" in this example) in the candidate group.

Figure 3C:
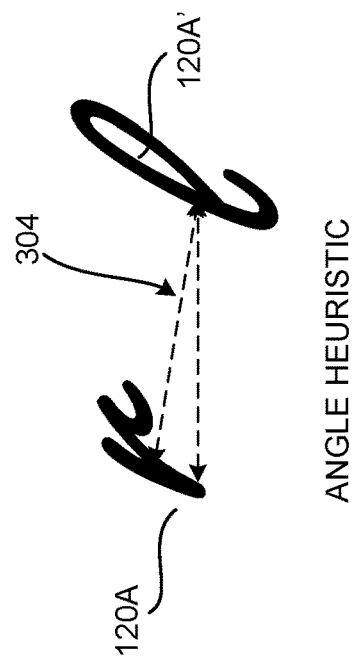

As shown in FIG. 3C, the stroke heuristics 124 might also include an angle heuristic that measures the angle 304 between the center of a first previously-made stroke 120A (the letter "r" in this example) and the center of a second previously-made stroke 120A' in the candidate group (the letter "l" in this example). The stroke heuristics 124 might also include a time heuristic, illustrated in FIG. 3D, which measures the time 306 between the end of a first previously-made stroke (the letter "r" in this case) and the start of a second previously-made stroke (the letter "l" in this case). The stroke heuristics 124 can also include a length heuristic, illustrated in FIG. 3E, that defines the length 308 (approximated as the dashed line in FIG. 3E) of a previously-made stroke 120A.

Figure 3F:
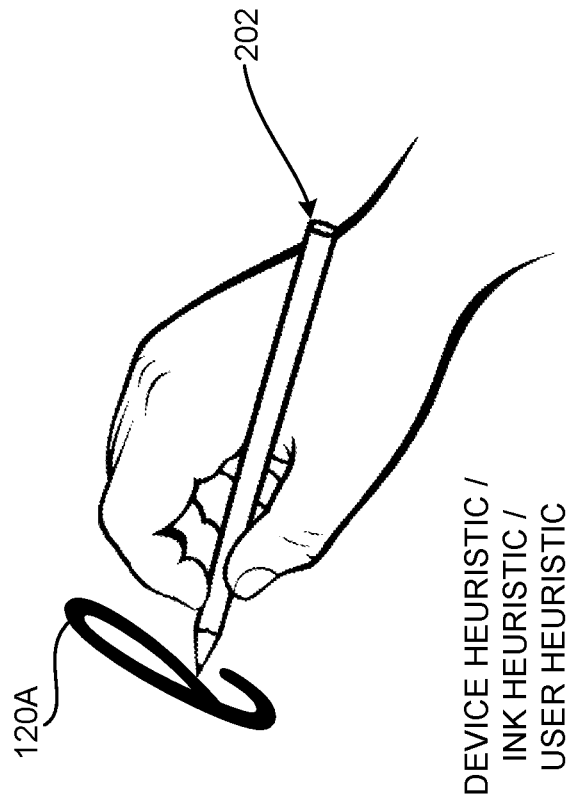
Figure 3E:
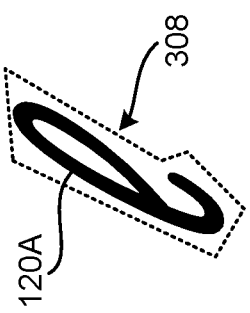

As shown in FIG. 3F, the stroke heuristics 124 can also include a device heuristics that identifies the device, such as the digital pen 202, that was used to create a previously-made stroke 120A of digital ink. The stroke heuristics 124 can also include a user heuristic that identifies the user that created a previously-made stroke 120A of digital ink. The stroke heuristics 124 might also include an ink type heuristic defining an ink type (e.g. color, thickness, pen type, etc.) used to create a previously-made stroke 120A of digital ink. Other stroke heuristics 120A can be utilized in other configurations.

The stroke heuristics 124 described above are computed for each stroke 120A in the candidate group 116A. The group heuristics 126 are then computed in one embodiment by averaging the stroke heuristics 124 for the strokes 120A in the candidate group 116A. Because the device heuristic, user heuristic, and ink type heuristic are categories, rather than numbers, their average is calculated in one embodiment as the percent distribution of items in each category.

In one embodiment, values for the distance and time heuristics are increased by a fixed amount or percentage when computing the averages for these heuristics. In another embodiment, strokes 114 are skipped if they are less than a predetermined amount smaller than the average size of strokes in a group 116. For example, strokes might be skipped that are less than $1/10^{th}$ the average size of the strokes in a group. These adjustments cause smaller values to have less overall impact on the average than larger values. As a result, less emphasis can be placed on small strokes, such as small dots and lines that tend to be outliers when compared to the rest of the strokes in a group and that cause them to have a disproportionate effect on the averages in the group heuristics 126.

As described briefly above, heuristics 122 are also computed for the new stroke 114. The displacement, angle, and time heuristics for the new stroke 114 can be computed with reference to the last stroke made in the candidate group 116A.

It is to be appreciated that the heuristics described above are merely illustrative and that other, or alternate, heuristics can be used in other embodiments. For example, and without limitation, heuristics can be used that describe the curvature of strokes and data generated by a user input device while inking such as pen angle, azimuth, or pressure.

As discussed above, once the group heuristics 126 and the new stroke heuristics 122 have been computed, a confidence value 128 is computed for the new stroke 114 based upon a comparison (e.g. a standard deviation) between the heuristics 122 for the new stroke 114 and the group heuristics 126 for the candidate group 116. In particular, a displacement confidence is computed by comparing the displacement heuristic for the candidate group 116A to the displacement heuristic for the new stroke 114. Because the distance between words tends to be larger than the distance between letters, the average distance between strokes in a candidate group 116A and the new stroke 114 should be similar for the new stroke 114 to be placed into the candidate group 116A. Displacement confidence goes down proportional to how much further away the new stroke 114 is from the average displacement between strokes in the candidate group 116A.

Angle confidence can be computed by comparing the angle heuristic for the candidate group 118A to the angle heuristic for the new stroke 114. Because people tend to write in the same average direction, the average angle between strokes in the candidate group 116A and the new stroke 114 should be similar. Angle confidence goes down proportional to how much larger the angle of the new stroke 114 is as compared to the average angle between strokes in the candidate group 116A.

Time confidence can be computed by comparing the time heuristic for the candidate group 116A to the time heuristic for the new stroke 114. Because people tend to spend similar amounts of time between writing letters in a word, the average time between finishing and starting any two strokes in the candidate group 116A should be similar to the time between finishing the last stroke in the candidate group 116A and starting the new stroke 114. Time confidence goes down proportional to how much larger the new time is than the average times for strokes in the candidate group 116A.

Length confidence can be computed by comparing the length heuristic for the candidate group 116A to the length heuristic for the new stroke 114. Because letters within a group (e.g. a word) tend to be written with a similar scale, the average size of strokes in a candidate group 116A should not be significantly different than the size of the new stroke 114. Confidence goes down if the new stroke 114 is dramatically larger or smaller than the average stroke in the candidate group 116A.

Device confidence can be computed by comparing the device heuristic for the candidate group to the device heuristic for the new stroke 114. Because people rarely use a two devices to write a single word, the new stroke 116A should be written with the same device, or finger, etc., as the average of the strokes in the candidate group 116A for the new stroke 114 to be included in the group. Accordingly, confidence goes down if the new stroke 114 is written with a different device than the average for the candidate group 116A.

Ink type confidence can be computed by comparing the ink type heuristic for the candidate group to the ink type heuristic for the new stroke 114. Because people rarely use two different types of ink to write a single word, the new stroke 114 should be written with the same type of ink as the average for strokes in the candidate group 116A to be included in the group. Consequently, ink type confidence goes down if the new stroke 114 is written using a different ink type than the average of the candidate group 116A.

User confidence can be computed by comparing the user heuristic for the candidate group to the user heuristic for the new stroke 114. Because multiple users rarely work together to write a single word, the new stroke 114 should be written by the same user as the average for strokes in the candidate group 116A to be included in the group. User confidence goes down if the new stroke 114 is written by a different user than the average of the candidate group 116A.

As discussed above, in some configurations, the confidence value 128 for a candidate group 116A is produced by generating heuristic scores 127 based upon the new stroke heuristics 122 and the group heuristics 126. In one embodiment, for example, the heuristic scores 127 are computed by determining the number of standard deviations each heuristic 122 for the new stroke 114 are away from the corresponding group heuristic (i.e. the mean of the heuristics for all strokes in the candidate group). The heuristic scores 127 are then calculated as 2^(AbsoluteValue (number of standard deviations))*sign (number of standard deviations) in one embodiment. Other mechanisms can be used to compute the heuristic scores 127 in other configurations.

If the confidence value 128 exceeds a confidence threshold 130, which can be defined or adjusted (e.g. by modifying a preset base value) by a user such as through the use of a UI control 132, the new stroke 114 of digital ink is added to the candidate group 116. In this example, the new stroke 114 (the letter "d") might be added to the group 116A if the confidence value 128 exceeds the confidence threshold 130.

If the confidence value 128 does not exceed the confidence threshold 130, the process described above is repeated for the next group of the candidate groups 118. This process is repeated until the new stroke 114 has been assigned to a group 116 or all of the groups in the candidate groups 118 have been examined without identifying a group 116 for the new stroke 114. If the new stroke 114 cannot be assigned to a group, a new group 116C is created for the new stroke 114. Additional details regarding this process will be provided below with regard to FIGS. 4-6.

As discussed briefly above, the confidence threshold 130 can be defined or adjusted (e.g. by modifying a preset base value) by a user, such as through the use of a UI control 132. The confidence threshold 130 might also be set different for different applications or based upon other considerations. By setting the confidence threshold 130 to be low, the algorithm described above becomes less strict, which would cause it to start grouping entire sentences or even paragraphs. By setting the confidence threshold 130 to be higher, the algorithm described above becomes stricter, which causes it to group only multi-stroke letters or symbols and mostly putting strokes in their own groups.

Figure 4:
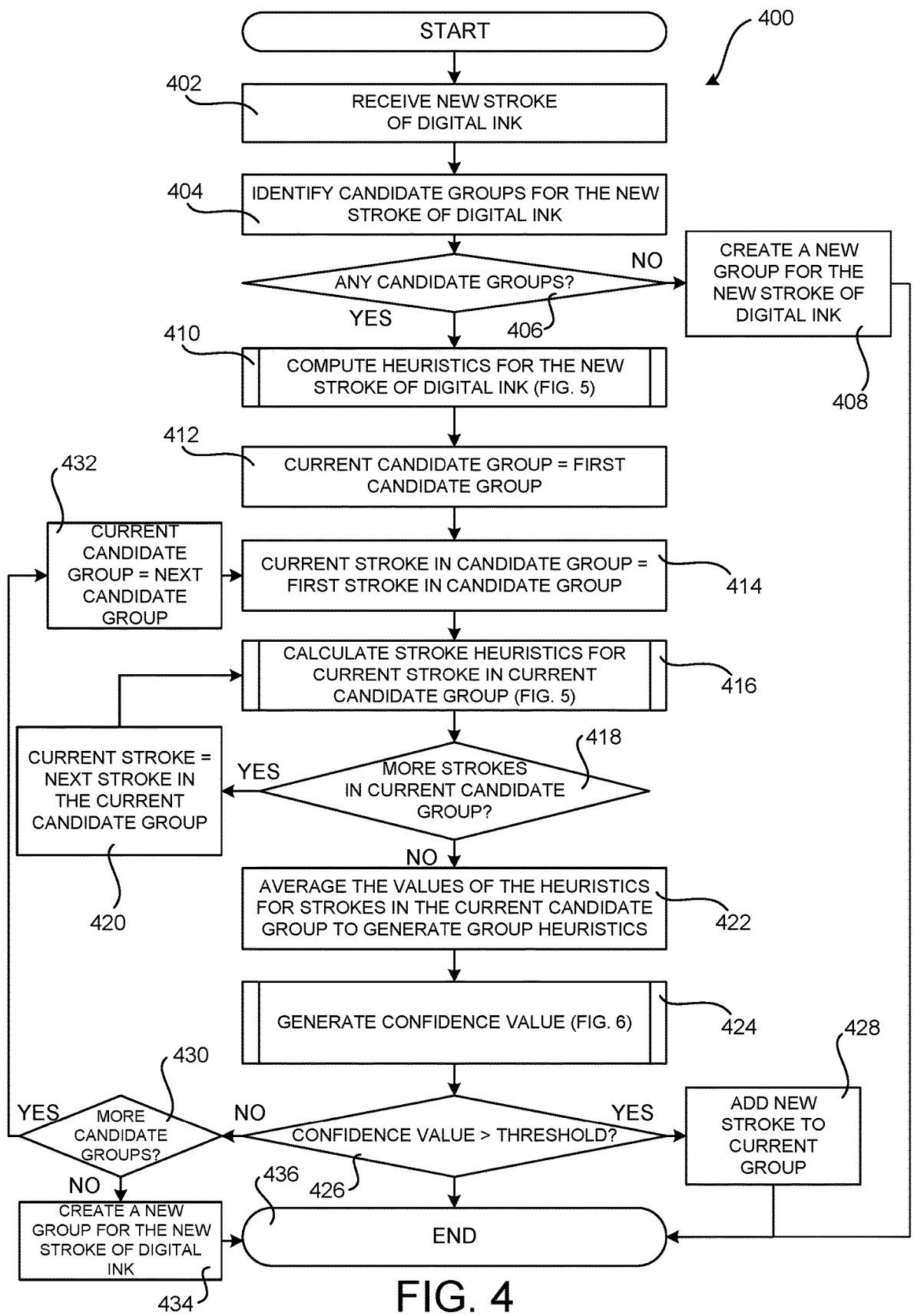
FIGS. 4-6 are flow diagrams showing several routines that illustrate aspects of the operation of the computing device shown in FIG. 1 for grouping strokes of digital ink.
Figure 5:
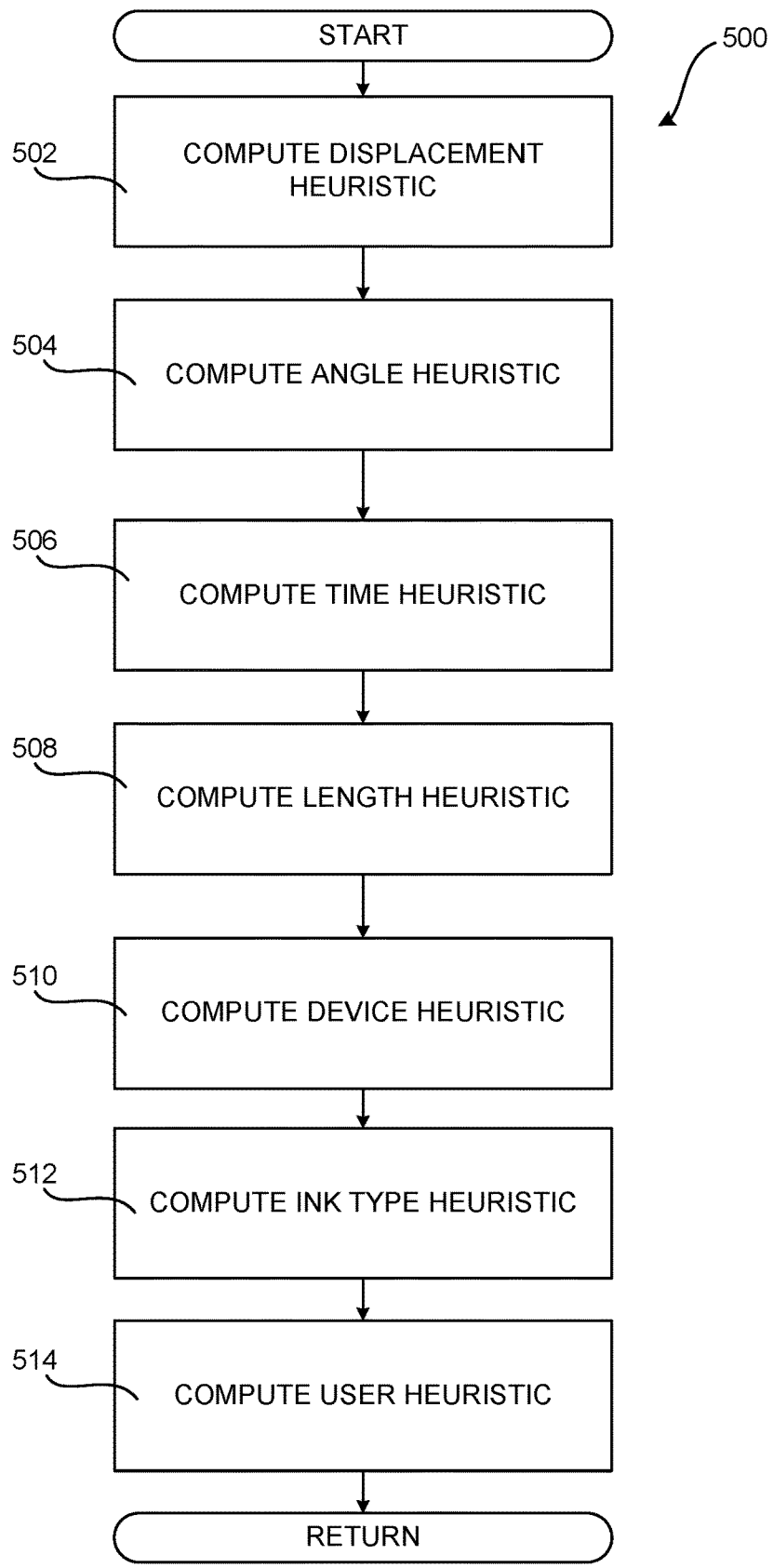
Figure 6:
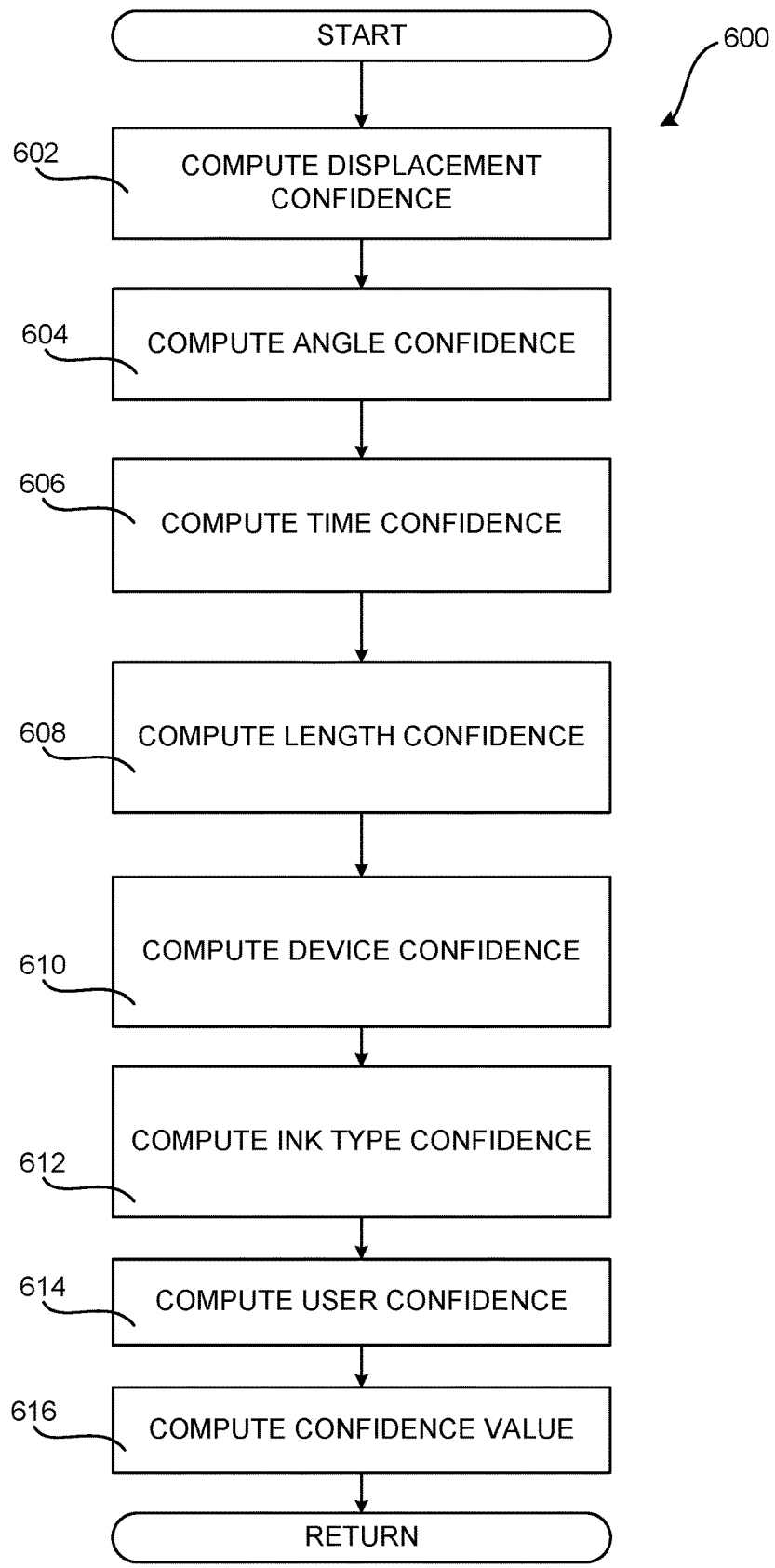

FIGS. 4-6 are flow diagrams showing several routines 400, 500, and 600, respectively, that illustrate aspects of the operation of the computing device shown in FIG. 1 for grouping strokes of digital ink. It should be appreciated that the logical operations described herein with regard to FIGS. 4-6, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

The routine 400 begins at operation 402, where a new stroke 114 of digital ink is received at the computing device 102. The routine 400 then proceeds from operation 402 to operation 404, where the computing device 102 attempts to identify candidate groups 118 for the new stroke 114. As discussed above, the candidate groups 118 for receiving a new stroke 114 can be selected in various ways. For example, and without limitation, all of the groups 116 of strokes 120 on a canvas 112 (e.g. a presentation slide) might be selected as candidate groups 118 for the new stroke 114. In another embodiment, groups 116 of strokes 120 within a predetermined radius selected based on the size of the new stroke 114 might be selected as the candidate groups 118. Other mechanisms for selecting candidate groups 118 for anew stroke 114 can be utilized in other configurations.

If no candidate groups 118 can be identified (e.g. when the new stroke 114 is the first stroke on a canvas 112), the routine 400 proceeds from operation 406, where anew group 116 is created for the new stroke 114. The routine 400 then proceeds from operation 408 to operation 436, where it ends.

If at least one candidate group 118 is identified, the routine 400 proceeds from operation 406 to operation 410. At operation 410, the computing device 102 computes the new stroke heuristics 122 for the new stroke 114 in the manner described above. Turning momentarily to FIG. 5, one illustrative routine 500 for computing heuristics will be described. In particular, the routine 500 begins at operation 502, where the computing device 102 computes a displacement heuristic. The routine 500 then proceeds to operation 504, where the computing device 102 computes an angle heuristic. The routine 500 then proceeds from operation 504 to operation 506.

At operation 506, the computing device 102 computes a length heuristic. The routine 500 then proceeds from operation 506 to operation 510, where the computing device 102 computes a device heuristic. The routine 500 then proceeds to operation 512, where the computing device 102 computes an ink type heuristic. Finally, at operation 514, the computing device 102 computes a user heuristic. As discussed above, additional or alternative heuristics can be computed and utilized in the manner described herein in other embodiments.

Returning now to FIG. 4, the routine 400 proceeds from operation 410 to operation 412, where the computing device 102 initializes a variable to keep track of the candidate group that is currently being evaluated. The routine 400 then proceeds from operation 412 to operation 414, where the computing device 102 initializes a variable to keep track of the current stroke in the current candidate group that is being evaluated. The routine 400 then proceeds from operation 414 to operation 416.

At operation 416, the computing device 102 computes the stroke heuristics 124 for the current stroke in the current candidate group. The process shown in FIG. 5 and described above can be utilized to compute the stroke heuristics 124. The routine 400 then proceeds from operation 416 to operation 418.

At operation 418, the computing device 102 determines if there are additional strokes in the current candidate group. If so, the routine 400 proceeds to operation 420, where the variable used to keep track of the current stroke is incremented to identify the next stroke in the current candidate group. The stroke heuristics 124 for the next stroke in the current candidate group are then computed as described above. In this way, stroke heuristics 124 are computed for each stroke in the current candidate group.

In some configurations, a determination is made as to whether there are enough strokes in the candidate group (e.g. three or more). If there are not enough strokes in the candidate group, strokes heuristics from a nearby group can be utilized.

Once stroke heuristics 124 have been computed for each of the strokes in the current candidate group, the routine 400 proceeds to operation 422. At operation 422, the computing device 102 averages the values of the stroke heuristics 124 for the strokes in the current candidate group in order to generate the group heuristics 126 for the current candidate group. This process was described above with regard to FIGS. 3A-3D.

From operation 422, the routine 400 proceeds to operation 424, where the computing device 424 generates the confidence value 128 for the new stroke 114 and the current candidate group. Referring momentarily to FIG. 6, one illustrative routine 600 for computing the confidence value 128 will be described. In particular, the routine 600 begins at operation 602, where the computing device 102 computes the displacement confidence in the manner described above. The routine 600 then proceeds to operation 604, where the computing device computes the angle confidence in the manner described above.

From operation 604, the routine 600 proceeds to operation 606, where the computing device computes the time confidence in the manner described above. The routine 600 then proceeds to operation 608, where the computing device 102 computes the length confidence. Subsequently, the routine 600 proceeds to operation 610, where the computing device 102 computes the device confidence in the manner described above. The routine 600 then proceeds to operations 612 and 612, where the computing device 102 computes the ink type and user confidence, respectively, in the manner described above.

Finally, at operation 616, the computing device 102 computes the confidence value 128. As discussed above, in one embodiment the confidence value 128 can be computed by multiplying the heuristic scores 127 by the heuristic weights 129 and summing the results. The heuristic weights 129 can be user-specified or can be learned using machine learning. One mechanism for learning the heuristics using ML will be described below. The confidence value 128 can be computed in other ways in other configurations. It is to be appreciated that the processing described above with regard to operations 602-614 can be performed in any order or in parallel.

Returning now to FIG. 4, the routine 400 proceeds from operation 424 to operation 426, where the computing device determines if the confidence value 128 computed at operation 616 exceeds the confidence threshold 130. If so, the routine 400 proceeds to operation 428, where the new stroke 114 is added to the current candidate group. The routine 400 then proceeds from operation 428 to operation 436, where it ends.

In the example shown in FIG. 4, the described process continues until a candidate group is identified that has a confidence value greater than the confidence threshold 130. In other configurations, however, all of the candidate groups can be processed in the manner described above and a group for the new stroke 114 selected based upon the confidence values 128 computed for the candidate groups. For instance, the candidate group having the highest confidence value 128 might be selected as the group for the new stroke 114.

If the confidence value 128 computed at operation 616 does not exceed the confidence threshold 130, the routine 400 proceeds to operation 420, where the computing device 102 determines if additional candidate groups remain to be evaluated. If so, the routine 400 proceeds to operation 432, where the variable used to keep track of the current candidate group is incremented to identify the next candidate group. The routine 400 then proceeds from operation 432 to operation 414, where the process described above can be repeated for the next candidate group.

If no further candidate groups remain to be evaluated, the routine 400 proceeds from operation 430 to operation 434, where a new group is created for the new stroke 114. The routine 400 then proceeds from operation 434 to operation 436, where it ends.

Figure 7A:
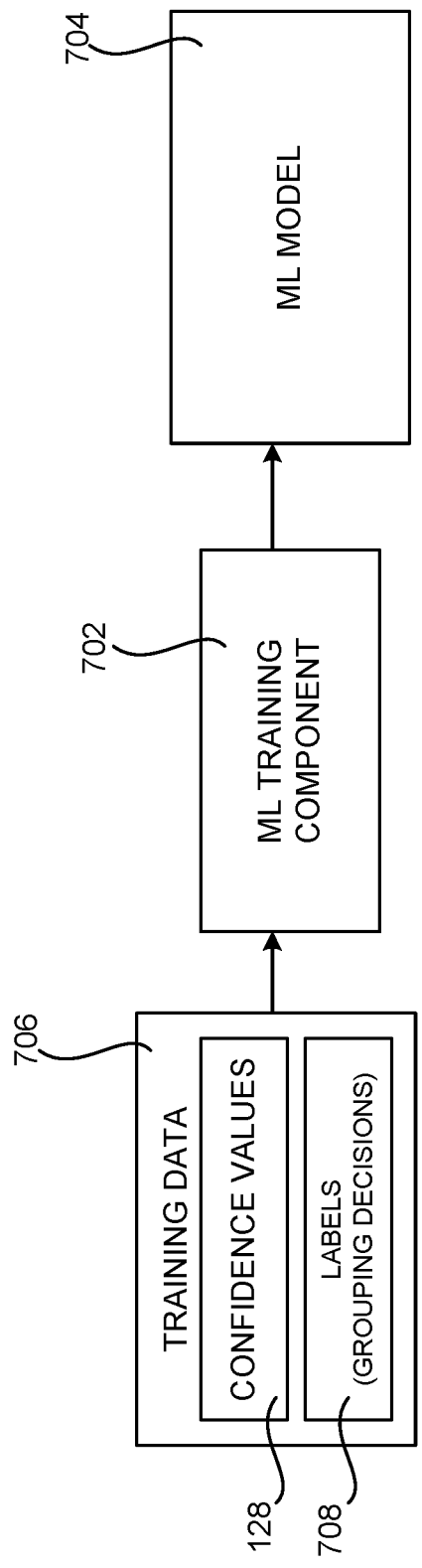
FIGS. 7A and 7B are software architecture diagrams showing aspects of one mechanism disclosed herein for grouping strokes of digital ink using a machine learning model, according to one embodiment.
Figure 7B:
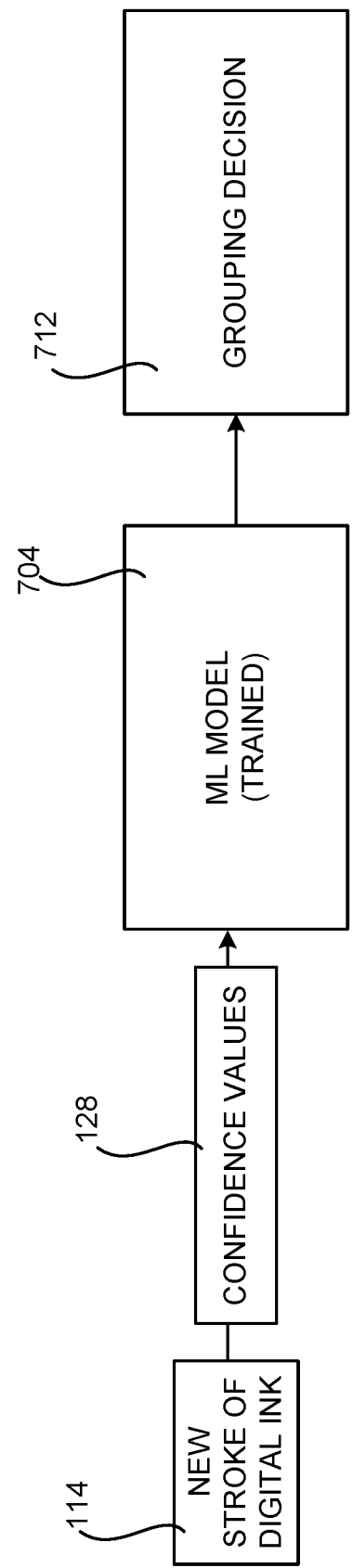

FIG. 7 is a software architecture diagram showing aspects of one mechanism disclosed herein for grouping strokes of digital ink using a ML model, according to one embodiment. As discussed briefly above, the confidence values 128 described above can be utilized in conjunction with a ML model, such as a support vector machine ("SVM"), to group strokes of digital ink. For example, in one configuration ML is used to train group heuristics 126 to pick an optimal set of heuristic weights 129 that make the highest percentage of correct groupings when used along with the group heuristics 126 to produce a confidence value 128. In some configurations, a second ML algorithm can run using the confidence values and correctness labels to train a better threshold. User corrections to grouping decisions made by the ML model can be utilized for further training of the ML model.

As shown in FIG. 7, given a set of group heuristics 126 (training data 706) for a stroke and whether or not that stroke should be part of the group given those scores (labels 708), a ML training component 702 can find the set of heuristic weights 129 that maximizes the number of correct classifications. Then, the weights 129 learned by the ML model are saved and used for all users.

When an SVM is used, the resulting support vector that maximizes the percentage of correct labels contains the heuristic weights 129. In this example, for instance, each stroke's seven heuristic scores and group heuristics 126 represent a point in seven-dimensional space. The SVM finds the six-dimensional hyperplane that splits strokes that were added to a group on one side, and strokes that were not added to a group on the other side. It also attempts to maximize the margin between the closest point on either side to its support vectors forming the hyperplane.

Figure 8:
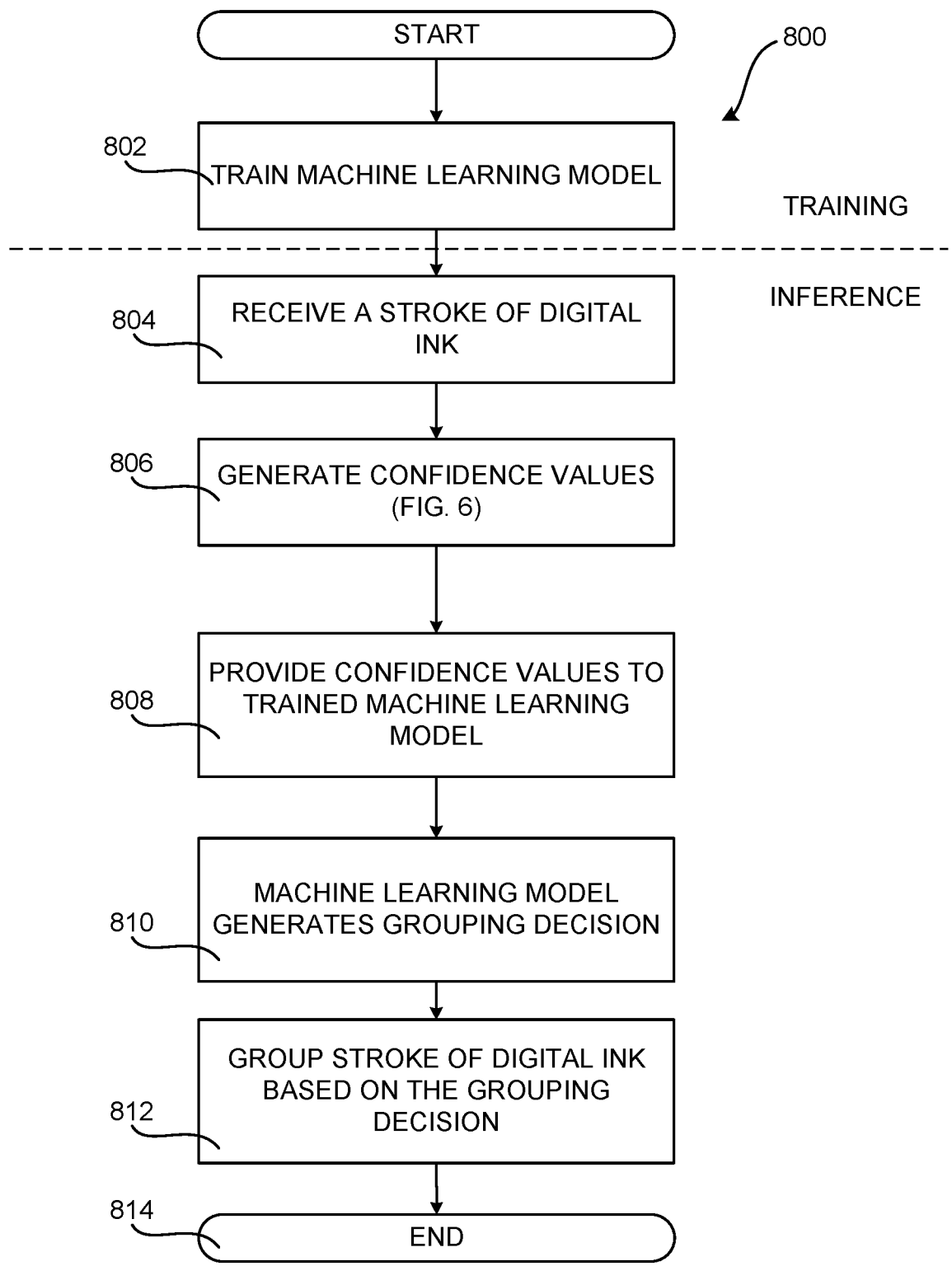
FIG. 8 is a flow diagram showing a routine that illustrates aspects of the operation of the mechanism shown in FIG. 7 for grouping strokes of digital ink using a machine learning model, according to one embodiment.

FIG. 8 is a flow diagram showing a routine 800 that illustrates aspects of the operation of the mechanism shown in FIG. 7 for grouping strokes of digital ink using a machine learning model, according to one embodiment. The routine 800 begins at operation 802, where the ML training component 702 learns the heuristic weights 129 in the manner described above with regard to FIG. 7. The routine 700 then proceeds to operation 704, where the learned weights 129 can be used to group new strokes of digital ink in the manner described above with regard to FIGS. 1-6. The routine 800 then proceeds from operation 804 to operation 806, where it ends.

Figure 9:
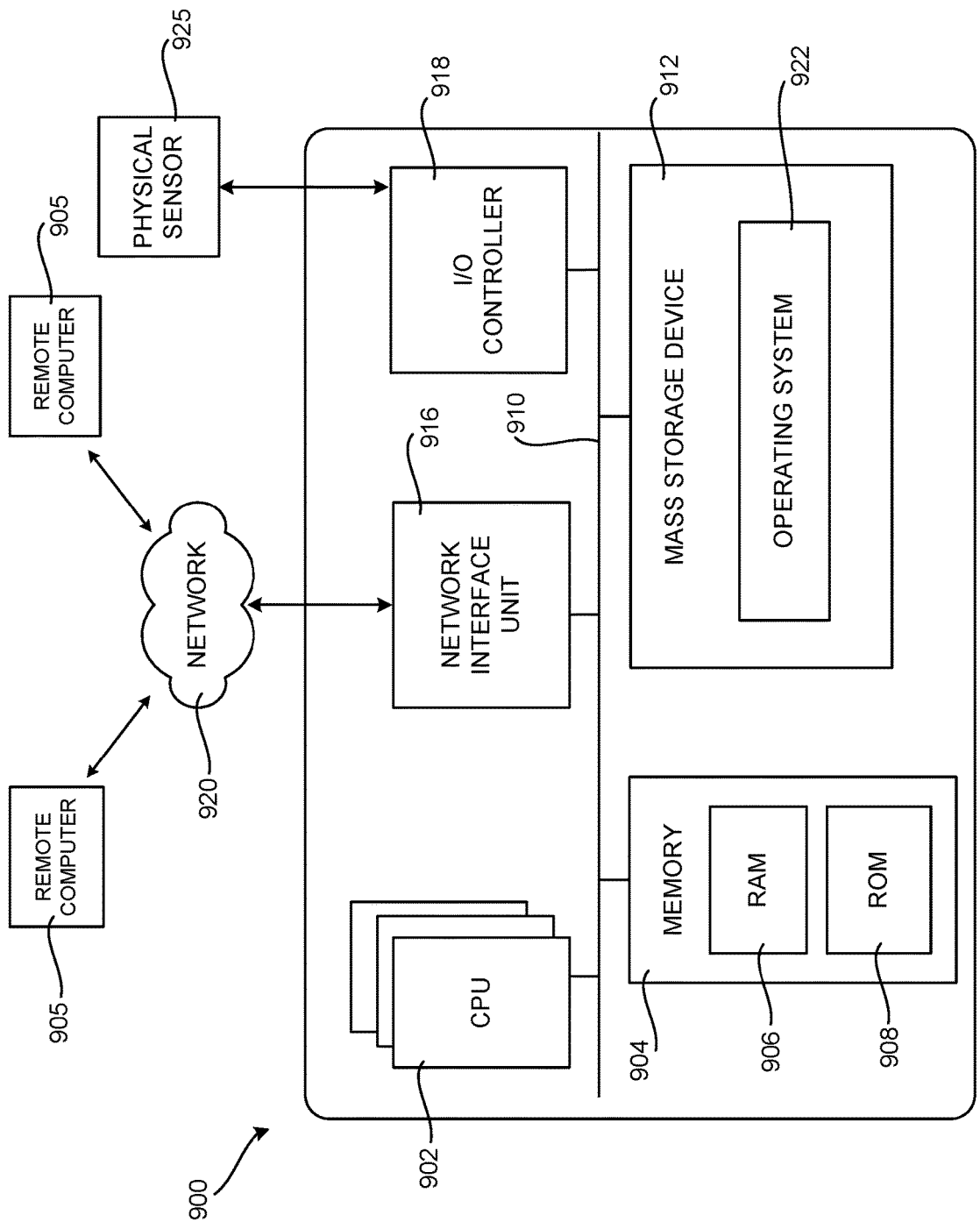
FIG. 9 is a computer architecture diagram showing an illustrative computer hardware and software architecture for a computing device that can implement aspects of the technologies presented herein.

FIG. 9 is a computer architecture diagram showing an illustrative computer hardware and software architecture for a computing device that can implement the various technologies presented herein. In particular, the architecture illustrated in FIG. 9 can be utilized to implement the computing device 102 described herein. The illustrated architecture can also be utilized to implement other types of computing systems.

The computer 900 illustrated in FIG. 9 includes a central processing unit 902 ("CPU"), a system memory 904, including a random-access memory 906 ("RAM") and a read-only memory ("ROM") 908, and a system bus 910 that couples the memory 904 to the CPU 902. A basic input/output system ("BIOS" or "firmware") containing the basic routines that help to transfer information between elements within the computer 900, such as during startup, can be stored in the ROM 908. The computer 900 further includes a mass storage device 912 for storing an operating system 922, application programs, and other types of programs. The functionality described above for grouping strokes of digital ink is implemented by one or more of these programs in various configurations. The mass storage device 912 can also be configured to store other types of programs and data.

The mass storage device 912 is connected to the CPU 902 through a mass storage controller (not shown) connected to the bus 910. The mass storage device 912 and its associated computer readable media provide non-volatile storage for the computer 900. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 900.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 900. For purposes of the claims, the phrase "computer storage medium," and variations thereof, does not include waves or signals per se or communication media.

According to various configurations, the computer 900 can operate in a networked environment using logical connections to remote computers through a network such as the network 920. The computer 900 can connect to the network 920 through a network interface unit 916 connected to the bus 910. It should be appreciated that the network interface unit 916 can also be utilized to connect to other types of networks and remote computer systems. The computer 900 can also include an input/output controller 918 for receiving and processing input from a number of other devices, including a keyboard, mouse, touch input, a digital pen 202, or a physical sensor such as a video camera.

The input/output controller 918 can also, or alternately, provide output to one or more displays screens, such as the display device 104. As discussed above, the display device 104 might be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or a screen implementing another touchscreen technology. In some configurations, a touchscreen is incorporated on top of a display as a transparent layer.

It should be appreciated that the software components described herein, when loaded into the CPU 902 and executed, can transform the CPU 902 and the overall computer 900 from a general-purpose computing device into a special-purpose computing device customized to facilitate the functionality presented herein. The CPU 902 can be constructed from any number of transistors or other discrete circuit elements, which can individually or collectively assume any number of states. More specifically, the CPU 902 can operate as a finite-state machine, in response to executable instructions contained within the software modules disclosed herein. These computer-executable instructions can transform the CPU 902 by specifying how the CPU 902 transitions between states, thereby transforming the transistors or other discrete hardware elements constituting the CPU 902.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 900 in order to store and execute the software components presented herein. It also should be appreciated that the architecture shown in FIG. 9 for the computer 900, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the computer 900 might not include all of the components shown in FIG. 9, can include other components that are not explicitly shown in FIG. 9, or can utilize an architecture completely different than that shown in FIG. 9.

It should be appreciated that the computing architecture shown in FIG. 9 has been simplified for ease of discussion. It should also be appreciated that the illustrated computing architecture can include and utilize many more computing components, devices, software programs, networking devices, and other components not specifically described herein.

The disclosure presented herein also encompasses the subject matter set forth in the following clauses:

Clause 1. A computing device, comprising: a processor; and a memory storing instructions executable by the processor to: receive a new stroke of digital ink, responsive to receiving the new stroke of digital ink, identify candidate groups for the new stroke of digital ink, compute heuristics for a group selected from the candidate groups for the new stroke of digital ink, generate a confidence value based on the heuristics for the group selected from the candidate groups and heuristics for the new stroke of digital ink, determine whether the confidence value exceeds a confidence threshold, and adding the new stroke of digital ink to the group selected from the candidate groups if the confidence value exceeds the confidence threshold.

Clause 2. The computing device of clause 1, wherein the set of candidate groups for the stroke comprises all of the groups on a canvas.

Clause 3. The computing device of clauses 1 or 2, wherein the set of candidate groups for the stroke encompasses groups on a canvas within a radius determined based on a size of the new stroke of digital ink.

Clause 4. The computing device of any of clauses 1-3, wherein the threshold is user-adjustable.

Clause 5. The computing device of any of clauses 1-4, wherein the heuristics for the group selected from the candidate groups are computed based upon heuristics for previously-made strokes of digital ink in the group selected from the candidate groups.

Clause 6. The computing device of any of clauses 1-5, wherein the heuristics for the previously-made strokes of digital ink comprise a displacement heuristic measuring a distance from a center of a first previously-made stroke of digital ink to a center of a second previously-made stroke of digital ink.

Clause 7. The computing device of any of clauses 1-6, wherein the heuristics for the previously-made strokes of digital ink comprise an angle heuristic measuring an angle between a center of a first previously-made stroke of digital ink and a center of a second previously-made stroke of digital ink.

Clause 8. The computing device of any of clauses 1-7, wherein the heuristics for the previously-made strokes of digital ink comprise a time heuristic measuring a time between an end of a first previously-made stroke of digital ink and a start of a second previously-made stroke of digital ink.

Clause 9. The computing device of any of clauses 1-8, wherein the heuristics for the previously-made strokes of digital ink comprise a length heuristic defining a length of a previously-made stroke of digital ink.

Clause 10. The computing device of any of clauses 1-9, wherein the heuristics for the previously-made strokes of digital ink comprise a device heuristic defining a device used to create a previously-made stroke of digital ink.

Clause 11. The computing device of any of clauses 1-10, wherein the heuristics for the previously-made strokes of digital ink comprise an ink type heuristic defining an ink type used to create a previously-made stroke of digital ink.

Clause 12. The computing device of any of clauses 1-11, wherein the heuristics for the previously-made strokes of digital ink comprise a user heuristic defining a user that created a previously-made stroke of digital ink.

Clause 13. A computer-implemented method, comprising: receiving a new stroke of digital ink; identifying a candidate group for the new stroke of digital ink; computing heuristics for the candidate group; generating a confidence value based on the heuristics for the candidate group and heuristics for the new stroke of digital ink; and adding the new stroke of digital ink to the candidate group if the confidence value exceeds a confidence threshold.

Clause 14. The computer-implemented method of clause 13, wherein the confidence value is computed by comparing the heuristics for the candidate group and the heuristics for the new stroke of digital ink.

Clause 15. The computer-implemented method of any of clauses 13 or 14, wherein the heuristics for the candidate group and the heuristics for the new stroke of digital ink comprise one or more of a displacement heuristic, an angle heuristic, a time heuristic, a length heuristic, a device heuristic, an ink type heuristic, or a user heuristic.

Clause 16. The computer-implemented method of any of clauses 13-15, wherein the confidence threshold is user-definable.

Clause 17. A computer-readable storage medium having computer-executable instructions stored thereupon which, when executed by a processor, cause the processor to: receive a new stroke of digital ink; identify a candidate group for the new stroke of digital ink; compute heuristics for the candidate group; generate a confidence value based on the heuristics for the candidate group and heuristics for the new stroke of digital ink; and add the new stroke of digital ink to the candidate group if the confidence value exceeds a confidence threshold.

Clause 18. The computer-readable storage medium of clause 17, wherein the confidence value is computed based, at least in part, using weights generated by a machine learning model.

Clause 19. The computer-readable storage medium of any of clauses 17 or 18, wherein the confidence threshold is user-definable.

Clause 20. The computer-readable storage medium of any of clauses 17-19, wherein the heuristics for the candidate group and the heuristics for the new stroke of digital ink comprise one or more of a displacement heuristic, an angle heuristic, a time heuristic, a length heuristic, a device heuristic, an ink type heuristic, or a user heuristic.

Based on the foregoing, it should be appreciated that technologies for grouping strokes of digital ink have been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computing device, comprising:
   a processor; and
   a memory storing instructions executable by the processor to:
   receive a new stroke of digital ink on a canvas,
   determine a size of the new stroke of digital ink,
   select a radius based on the size of the new stroke of digital ink, establish an area that surrounds the new stroke of digital ink using the radius,
identify candidate groups for the new stroke of digital ink, wherein an individual candidate group of the candidate groups includes previously-made strokes of digital ink that are located on the canvas in the area that surrounds the new stroke of digital ink,
compute heuristics for a group selected from the candidate groups,
generate a confidence value based on the heuristics for the group selected from the candidate groups and heuristics for the new stroke of digital ink,
determine whether the confidence value exceeds a confidence threshold, and
adding the new stroke of digital ink to the group selected from the candidate groups if the confidence value exceeds the confidence threshold.

2. The computing device of claim 1, wherein the candidate groups for the stroke comprises all of the groups on a canvas.

3. The computing device of claim 1, wherein the confidence threshold is user-adjustable.

4. The computing device of claim 1, wherein the heuristics for the group selected from the candidate groups comprise a displacement heuristic measuring a distance from a center of a first previously-made stroke of digital ink to a center of a second previously-made stroke of digital ink.

5. The computing device of claim 1, wherein the heuristics for the group selected from the candidate groups comprise an angle heuristic measuring an angle between a center of a first previously-made stroke of digital ink and a center of a second previously-made stroke of digital ink.

6. The computing device of claim 1, wherein the heuristics for the group selected from the candidate groups comprise a time heuristic measuring a time between an end of a first previously-made stroke of digital ink and a start of a second previously-made stroke of digital ink.

7. The computing device of claim 1, wherein the heuristics for the group selected from the candidate groups comprise a length heuristic defining a length of a previously-made stroke of digital ink.

8. The computing device of claim 1, wherein the heuristics for the group selected from the candidate groups comprise a device heuristic defining a device used to create a previously-made stroke of digital ink.

9. The computing device of claim 1, wherein the heuristics for the group selected from the candidate groups comprise an ink type heuristic defining an ink type used to create a previously-made stroke of digital ink.

10. The computing device of claim 1, wherein the heuristics for the group selected from the candidate groups comprise a user heuristic defining a user that created a previously-made stroke of digital ink.

11. A computer-implemented method, comprising:
receiving a new stroke of digital ink;
identifying a candidate group of previously-made strokes of digital ink for the new stroke of digital ink;
computing heuristics for the candidate group of previously-made strokes of digital ink, wherein the heuristics for the candidate group of previously-made strokes of digital ink are computed based at least upon a length of each of the previously-made strokes of digital ink;
computing heuristics for the new stroke of digital ink, wherein the heuristics for the new stroke of digital ink are computed based at least upon a length of the new stroke of digital ink;
generating a confidence value based on the heuristics for the candidate group and the heuristics for the new stroke of digital ink; and
adding the new stroke of digital ink to the candidate group if the confidence value exceeds a confidence threshold.

12. The computer-implemented method of claim 11, wherein the confidence value is computed by comparing the heuristics for the candidate group and the heuristics for the new stroke of digital ink.

13. The computer-implemented method of claim 12, wherein the heuristics for the candidate group and the heuristics for the new stroke of digital ink comprise one or more of a displacement heuristic, an angle heuristic, a time heuristic, a device heuristic, an ink type heuristic, or a user heuristic.

14. A computer-readable storage medium having computer-executable instructions stored thereupon which, when executed by a processor, cause the processor to:
receive a new stroke of digital ink;
identify a candidate group of previously-made strokes of digital ink for the new stroke of digital ink;
determine heuristics for the candidate group of previously-made strokes of digital ink, wherein the heuristics for the candidate group of previously-made strokes of digital ink include an identification of a user that created at least one of the previously-made strokes of digital ink;
determine heuristics for the new stroke of digital ink, wherein the heuristics for the new stroke of digital ink include an identification of a user that created the new stroke of digital ink;
generate a confidence value based on the heuristics for the candidate group and the heuristics for the new stroke of digital ink; and
add the new stroke of digital ink to the candidate group if the confidence value exceeds a confidence threshold.

15. The computer-readable storage medium of claim 14, wherein the confidence value is computed based, at least in part, using weights generated by a machine learning model.

16. The computer-readable storage medium of claim 14, wherein the confidence threshold is user-definable.

17. The computer-readable storage medium of claim 14, wherein the heuristics for the candidate group and the heuristics for the new stroke of digital ink comprise one or more of a displacement heuristic, an angle heuristic, a time heuristic, a length heuristic, or a device heuristic, an ink type heuristic.

* * * * *